United States Patent
Danburg et al.

(10) Patent No.: US 10,830,447 B2
(45) Date of Patent: Nov. 10, 2020

(54) JOINT FOR SEALING A GAP BETWEEN CASING SEGMENTS OF AN INDUSTRIAL GAS TURBINE ENGINE COMBUSTOR

(71) Applicant: United Technologies Corporation, Hartford, CT (US)

(72) Inventors: Randy J. Danburg, Scotland, CT (US); Claude I. Barnett, Lebanon, CT (US); Carlos G. Figueroa, Wellington, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 375 days.

(21) Appl. No.: 14/781,480

(22) PCT Filed: Apr. 29, 2014

(86) PCT No.: PCT/US2014/035895
§ 371 (c)(1),
(2) Date: Sep. 30, 2015

(87) PCT Pub. No.: WO2014/179328
PCT Pub. Date: Nov. 6, 2014

(65) Prior Publication Data
US 2016/0040886 A1    Feb. 11, 2016

Related U.S. Application Data

(60) Provisional application No. 61/817,096, filed on Apr. 29, 2013.

(51) Int. Cl.
*F23R 3/60* (2006.01)
*F23R 3/42* (2006.01)
(Continued)

(52) U.S. Cl.
CPC .............. *F23R 3/42* (2013.01); *B23K 1/0018* (2013.01); *F01D 9/023* (2013.01); *F01D 11/003* (2013.01);
(Continued)

(58) Field of Classification Search
CPC .. F23R 2900/00012; F23R 3/002; F23R 3/54; F23R 3/60; F23R 2900/00018;
(Continued)

(56) References Cited

U.S. PATENT DOCUMENTS

| 2005/0028527 A1* | 2/2005 | Grady | ............ F23R 3/002 60/752 |
| 2006/0091182 A1* | 5/2006 | Ivory | ............ B23K 1/0018 228/101 |
| 2007/0130958 A1* | 6/2007 | Ohri | ............ F23R 3/60 60/796 |

(Continued)

*Primary Examiner* — Ehud Gartenberg
*Assistant Examiner* — Thomas P Burke
(74) *Attorney, Agent, or Firm* — Getz Balich LLC (57) ABSTRACT

A casing for a combustor includes an upstream segment, a downstream segment and a joint. The downstream segment is constructed and arranged to move telescopically with respect to the upstream segment and along a centerline. The joint includes a flange and bonding material, which attaches the flange to the upstream segment or the downstream segment. A melting point of the bonding material is less than a melting point of the flange and/or a melting point of the segments.

17 Claims, 7 Drawing Sheets

(51) Int. Cl.
*F23R 3/00* (2006.01)
*F23R 3/46* (2006.01)
*F01D 11/00* (2006.01)
*F01D 9/02* (2006.01)
*B23K 1/00* (2006.01)
*F02C 3/14* (2006.01)

(52) U.S. Cl.
CPC ................ *F02C 3/14* (2013.01); *F23R 3/002* (2013.01); *F23R 3/46* (2013.01); *F23R 3/60* (2013.01); *B23P 2700/13* (2013.01); *F05D 2240/58* (2013.01); *F23R 2900/00012* (2013.01); *F23R 2900/00017* (2013.01); *F23R 2900/00018* (2013.01); *F23R 2900/00019* (2013.01)

(58) Field of Classification Search
CPC .... F23R 2900/00044; F23R 3/42; F02C 7/20; F02C 7/28; F01D 9/023; F01D 11/003; F05D 2230/237; F05D 2240/58; F05D 2240/581; F05D 2300/502
See application file for complete search history.

(56) References Cited

U.S. PATENT DOCUMENTS

| | | | |
|---|---|---|---|
| 2007/0251240 A1* | 11/2007 | Johnson | F01D 9/023 60/796 |
| 2009/0288422 A1 | 11/2009 | Cernay et al. | |
| 2010/0031666 A1* | 2/2010 | Chokshi | F23R 3/06 60/760 |
| 2011/0120135 A1* | 5/2011 | Johnson | F01D 9/023 60/772 |
| 2011/0252805 A1* | 10/2011 | Berry | F23R 3/002 60/772 |
| 2012/0186254 A1* | 7/2012 | Ito | B23K 1/0018 60/722 |
| 2012/0210729 A1* | 8/2012 | Cihlar | F01D 9/023 60/796 |
| 2013/0081399 A1* | 4/2013 | Wiebe | F01D 9/023 60/752 |
| 2013/0086920 A1* | 4/2013 | Chen | F23R 3/005 60/782 |
| 2013/0213047 A1* | 8/2013 | Desai | F23R 3/002 60/752 |
| 2014/0286770 A1* | 9/2014 | Henry | F01D 5/026 415/213.1 |

\* cited by examiner

JOINT FOR SEALING A GAP BETWEEN CASING SEGMENTS OF AN INDUSTRIAL GAS TURBINE ENGINE COMBUSTOR

CROSS-REFERENCE TO RELATED APPLICATIONS

This application claims priority to PCT Patent Application No. PCT/US14/35895 filed Apr. 29, 2014, which claims priority to U.S. Patent Appln. No. 61/817,096 filed Apr. 29, 2013.

BACKGROUND

1. Technical Field

This disclosure relates generally to an industrial gas turbine engine and, more particularly, to a joint for sealing a gap between casing segments of a combustor.

2. Background Information

A can combustor for an industrial turbine engine may include a dual-walled duct with a combustion gas path and an annular cooling gas path. The combustion gas path is defined radially within a liner. The cooling gas path is defined radially between the liner and a casing in which the liner is arranged.

The casing may include a flow sleeve mated with an impingement sleeve. A gap or annulus between the flow sleeve and the impingement sleeve may be sealed with a piston ring. Typically, the piston ring contacts an outer surface of the impingement sleeve, and extends radially into a channel. Such a channel is typically defined by a channeled flange that is welded to the flow sleeve.

Vibrations within the combustor during engine operation may cause the piston ring to vibrate within and/or otherwise move relative to the channeled flange. The piston ring therefore may rub against and wear interior surfaces of the channeled flange. Typically, these interior surfaces are difficult to refurbish or repair when worn. A worn channeled flange therefore may significantly reduce the longevity of the entire flow sleeve since the flange is welded to the flow sleeve.

There is a need in the art for an improved joint for sealing a gap between casing segments of an industrial gas turbine engine combustor.

SUMMARY OF THE DISCLOSURE

A casing is provided for a combustor. The casing includes an upstream segment, a downstream segment and a joint. The downstream segment is constructed and arranged to move telescopically with respect to the upstream segment and along a centerline. The joint includes a flange and bonding material for attaching the flange to the upstream segment or the downstream segment. A melting point of the bonding material is less than a melting point of the flange and a melting point of the segments.

The joint may include a ring. The flange may define a channel opened radially for receipt of the ring. The ring may be constructed and arranged to seal against the other one of the upstream and downstream segments. The ring may be configured as or otherwise include a piston ring.

The flange may be attached to the upstream segment. The ring may be in sliding contact with the downstream segment.

The upstream segment may be radially outward of the downstream segment at the joint.

The upstream segment may be configured as or otherwise include a flow sleeve. The downstream segment may be configured as or otherwise include an impingement sleeve.

The flange may be attached to a mounting portion of the respective upstream or downstream segment with the bonding material.

The flange may include a pair of endwalls and a sidewall that extends longitudinally between the endwalls. The endwalls may extend radially (e.g., inwards) from the sidewall. One of the endwalls may be attached to the mounting portion with the bonding material.

The flange may be brazed to the respective upstream or downstream segment with the bonding material, which may be brazing material.

A combustor is provided for an industrial gas turbine engine. The combustor includes a casing that is connected downstream of a nozzle assembly. The casing includes a plurality of segments and a joint that at least partially seals a gap between the segments. The joint includes a flange that is brazed to a mounting portion of a first of the segments.

The flange may be brazed to the mounting portion with brazing material. The brazing material may have a melting point that is less than a melting point of the mounting portion.

The mounting portion may be configured as or otherwise include a mounting flange.

The flange may define a channel. The joint may include a ring that extends radially into the channel and engages a second of the segments. The ring may be configured as or otherwise include a piston ring.

The flange may include a pair of endwalls and a sidewall that extends longitudinally between the endwalls. The endwalls may extend radially (e.g., inwards) from the sidewall. One of the endwalls may be brazed to the mounting portion.

The first of the segments may be configured as or otherwise include a flow sleeve. Alternatively, the first of the segments may be configured as or otherwise include an impingement sleeve.

The combustor may include a liner arranged radially within the casing.

A method is provided for repairing a casing for an industrial gas turbine engine. The casing includes a pair of segments and a joint for sealing a gap between the segments. The joint includes a first (e.g., worn) flange that is bonded to a first of the segments with bonding material. During the method, the bonding material is melted to break the bond between the first flange and the first of the segments. The first flange is removed from the first of the segments. A second (e.g., replacement) flange is bonded to the first of the segments.

The bonding of the second flange may include bonding the second flange to the first of the segments with bonding material having a melting point that is less than a melting point of the first of the segments.

The bonding of the second flange may include brazing the second flange to the first of the segments.

The foregoing features and the operation thereof will become more apparent in light of the following description and the accompanying drawings.

BRIEF DESCRIPTION OF THE DRAWINGS

Various features will become apparent to those skilled in the art from the following detailed description of the disclosed non-limiting embodiments. The drawings that accompany the detailed description may be briefly described as follows.

DETAILED DESCRIPTION

Figure 1:
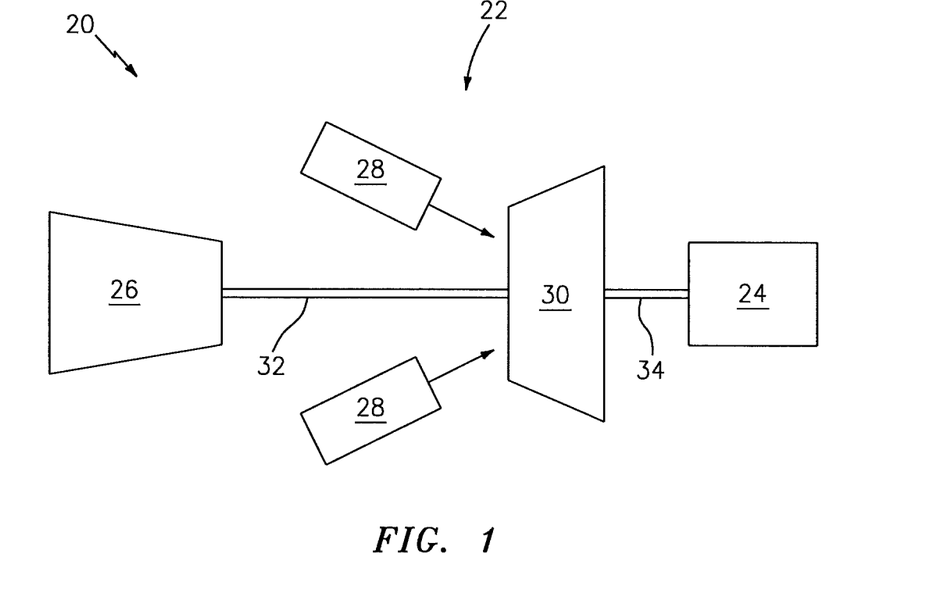
FIG. 1 is a schematic illustration of a system that includes an industrial gas turbine engine and an electrical generator.

FIG. 1 is a schematic illustration of a system 20 that includes an industrial gas turbine engine 22 and an electrical generator 24. The turbine engine 22 may be configured for a land based installation, and includes a compressor 26, a plurality of can combustors 28, and a turbine 30. The compressor 26 is connected to and driven by the turbine 30 through an engine shaft 32. The can combustors 28 are arranged about the engine shaft 32, and are fluidly coupled between the compressor 26 and the turbine 30. The electrical generator 24 is connected to and driven by the turbine 30 through a shaft 34.

Figure 2:
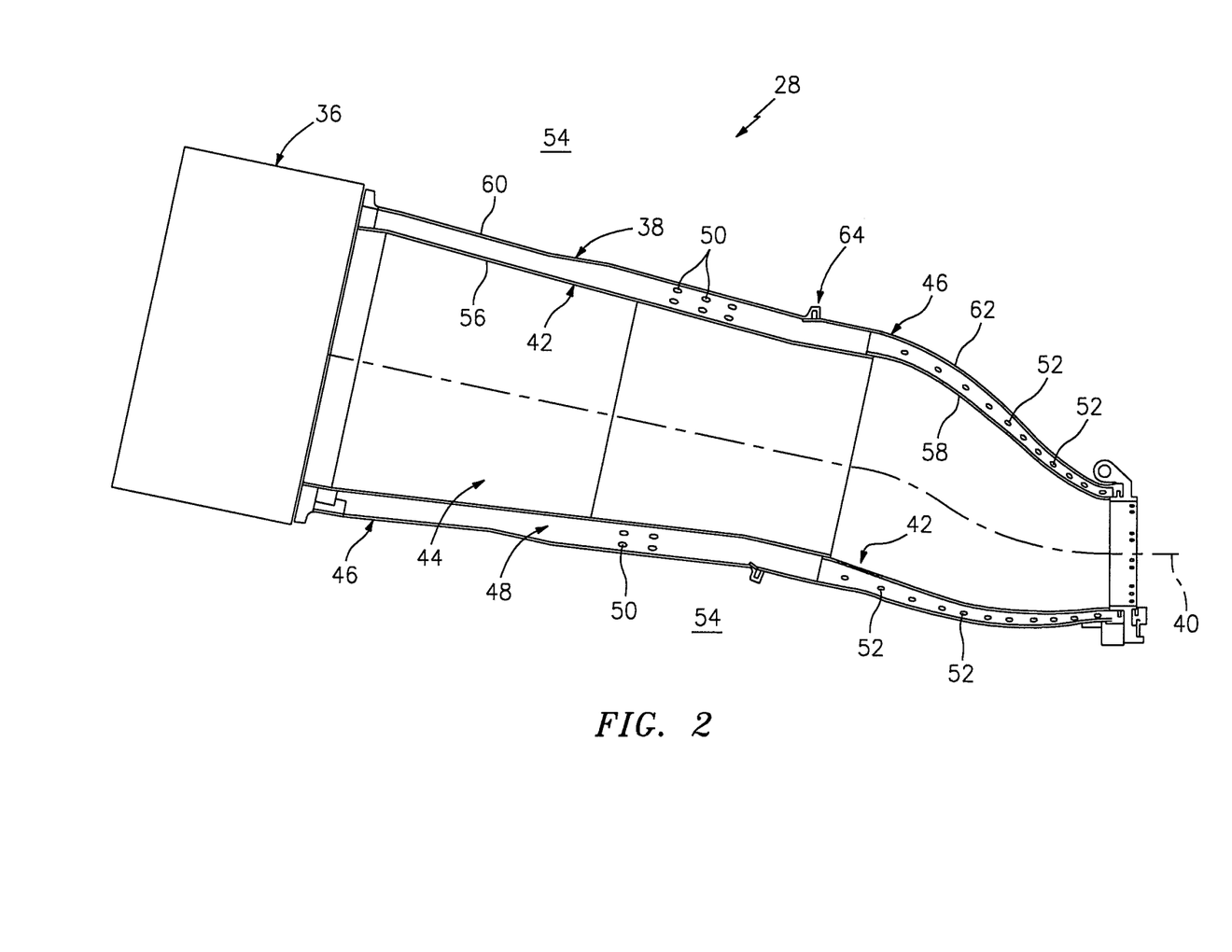
FIG. 2 is a side cutaway illustration of a can combustor for an industrial gas turbine engine.

FIG. 2 is a side cutaway illustration of one of the can combustors 28. Each of the combustors 28 includes a nozzle assembly 36 and a dual-walled duct 38. The nozzle assembly 36 includes one or more fuel nozzles (not shown), which may be arranged in a circular or star array. The nozzle assembly 36 may also include a plurality of premix tubes (not shown), each of which may receive a respective one of the fuel nozzles. The nozzle assembly 36 may alternatively omit one or more of the foregoing components and/or include various other components, and is not limited to any particular nozzle assembly types or configurations.

The dual-walled duct 38 spans longitudinally along a centerline 40 and in a downstream direction from the nozzle assembly 36 to the turbine 30 (see FIG. 1). The dual-walled duct 38 has an inner heat resistant shell 42 that defines a combustion chamber 44, and a casing 46 positioned radially outward from the shell 42. An annular cooling channel 48 or annulus is defined by, and radially between, the shell 42 and casing 46. A plurality of cooling holes 50 and 52 are in the casing 46 and positioned to cool the shell 42 by flowing air from a plenum 54 surrounding the casing 46 into the cooling channel 48 for impingement against the shell 42. The shell 42 may be bisected axially and thus includes an upstream segment that may be a combustor liner 56 and a downstream segment that may be a transition duct 58. Similarly, the casing 46 is bisected axially and has a tubular upstream segment that may be a flow sleeve 60 and a tubular downstream segment that may be an impingement sleeve 62. The casing 46 also has a sliding seal joint 64 constructed and arranged between the two segments 60 and 62 for preventing leakage of air into the cooling channel 48 from the plenum 54.

The combustor liner 56 of the shell 42 and flow sleeve 60 of the casing 46 may be joined structurally or rigidly at the nozzle assembly 36 or related structure so that the combustor liner 56 and flow sleeve 60 generally move axially in unison. Similarly, the transition duct 58 of the shell 42 and the impingement sleeve 62 of the casing 46 are joined structurally or rigidly at the turbine 30 (see FIG. 1) thus provoking a unified axial movement. As a result of turbine engine operation, the dual-walled duct 38 is designed to move telescopically along the centerline 40. Such movement may relieve stress caused from thermal expansion during engine warm-up or mechanical variances or movement due to normal operation. The joint 64 is designed to permit such telescopic movement while minimizing unwanted air leakage into the cooling channel 48 from the plenum 54. More particularly, the joint 64 is configured to at least partially or substantially seal an annular gap between the flow sleeve 60 and the impingement sleeve 62.

Figure 3:
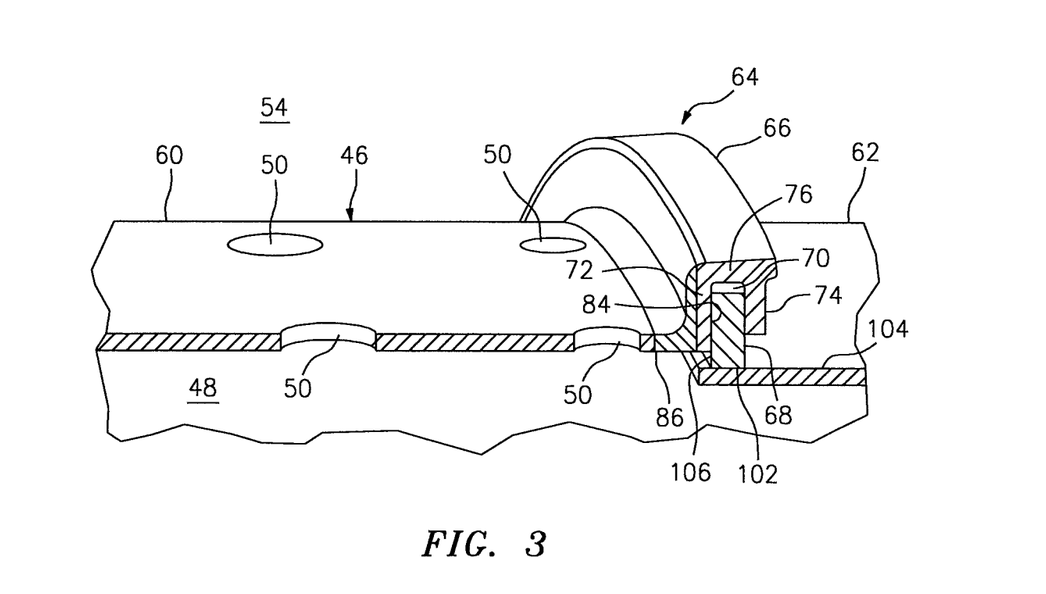
FIG. 3 is a perspective sectional illustration of a seal joint that seals a gap between casing segments of the can combustor.

FIG. 3 is a perspective sectional illustration of the joint 64. The joint 64 includes a flange 66 (e.g., a replaceable wear ring) and a seal ring 68, which is arranged within an annular channel 70 of the flange 66.

Figure 4:
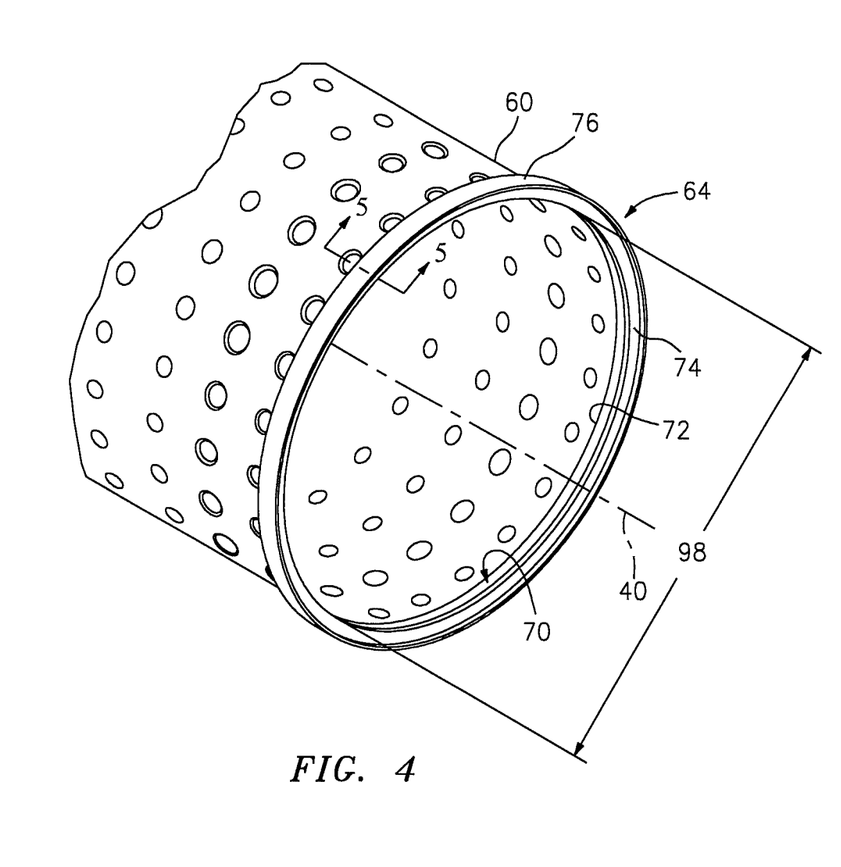
FIG. 4 is a partial perspective illustration of a flow sleeve with a flange for the can combustor.
Figure 5:
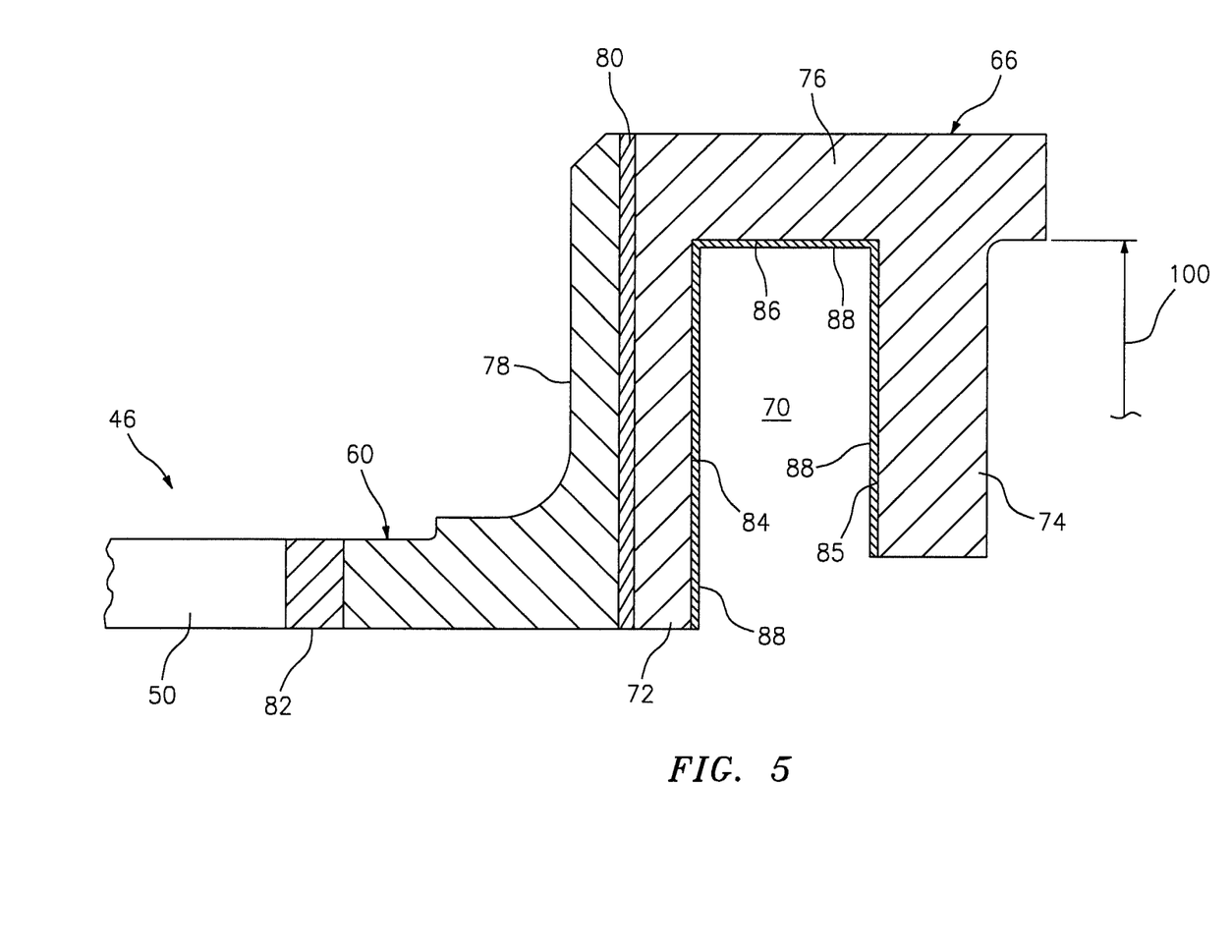
FIG. 5 is a partial sectional illustration of the flow sleeve and the flange of FIG. 4.

Referring to FIG. 4, the flange 66 extends around the centerline 40. Referring now to FIG. 5, the flange 66 includes an upstream endwall 72, a downstream endwall 74 and an outer sidewall 76 that extends longitudinally along the centerline between the endwalls 72 and 74. Each of the endwalls 72 and 74 extends radially inwards from the sidewall 76 towards the centerline. The upstream endwall 72 is bonded (e.g., brazed) or otherwise attached to a mounting portion 78 (e.g., a mounting flange) of the flow sleeve 60 with bonding material 80 (e.g., brazing material), which mounting portion 78 may be welded to or formed integral with another portion 82 of the flow sleeve 60. The bonding material 80 has a melting point that is less than a melting point of the material of the casing 46 (e.g., the flow sleeve 60 and/or the impingement sleeve 62) for reasons discussed below in further detail. The bonding material 80 may, for example, be AMS 4777 or 4778 metal. The casing material may be AMS 5511 metal. The flange 66 may be AMS 5616 (Greek Ascoloy) metal, AMS 5643 (17-4PH) metal, or AMS 5528 (17-7PH) metal. The duct 38, however, is not limited to the foregoing materials.

The flange 66 also includes a plurality of interior surfaces 84-86. The surface 84 is carried by the upstream endwall 72. The surface 85 is carried by the downstream endwall 74. The surface 86 is carried by the sidewall 76, and extends longitudinally along the centerline between the surfaces 84 and 85. The surfaces 84-86 define the channel 70 of the flange 66, which radially opens into the flange 66. The channel 70, for example, extends longitudinally within the flange 66 between the surfaces 84 and 85. The channel 70 extends radially into the flange 66 to the surface 86. One or more of the surfaces 84-86 may each be coated with a wear coating 88, which may have a hardness that is greater than that of the casing material. This wearing coating 88 may also have a melting point that is greater than the melting point of the bonding material 80. Alternatively, one or more of the surfaces 84-86 may be uncoated.

Figure 6:
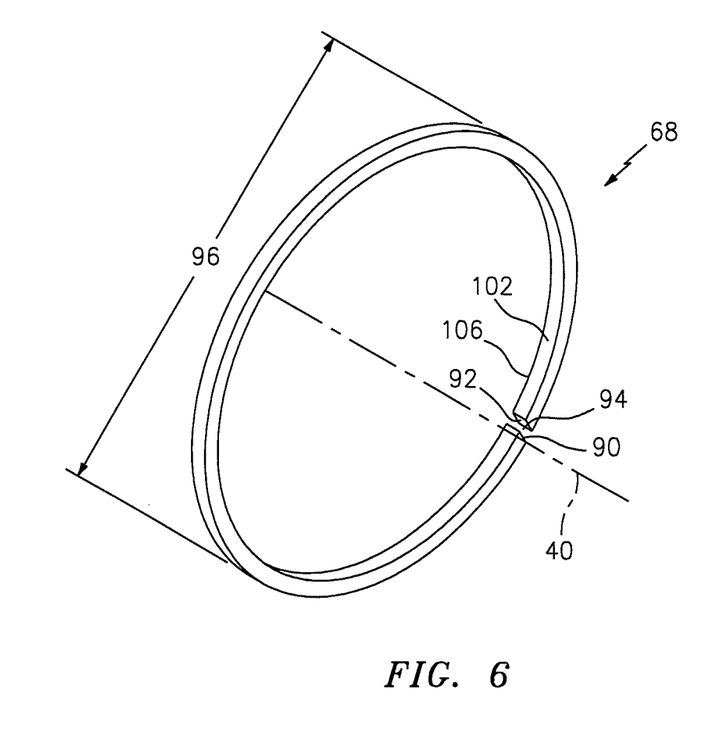
FIG. 6 is a perspective illustration of a seal ring of the seal joint.

Referring to FIG. 6, the ring 68 may be configured as a piston ring. The ring 68, for example, may extend around the centerline 40 between opposing faces 90 and 92. These faces 90 and 92 define an intra-face gap 94, which enables the ring 68 to be manipulated during assembly for insertion into the channel 70 (see FIG. 3). For example, the gap 94 may be sized such that an outer diameter 96 of the ring 68 is less than an inner diameter 98 of the downstream endwall 74 (see FIG. 4) when the ring 68 is circumferentially compressed and the faces 90 and 92 are touching (not shown). In this manner, referring to FIGS. 3 and 6, the ring 68 may slide past the downstream endwall 74 and be longitudinally aligned with the channel 70. Once the ring 68 passes the downstream endwall 74, the ring 68 may decompress and expand into the channel 70 such that the outer diameter 96 of the ring 68 is again greater than the inner diameter 98 of the downstream endwall 74 (see FIG. 4). However, there may be a gap between the ring 68 and the sidewall 76 allowing for thermal expansion during engine operation.

The ring 68 may also or alternatively be configured to enable the faces 90 and 92 to move longitudinally along the centerline 40 relative to one another. Such longitudinal splaying may enable the ring 68 to be thread into the channel 70 where, for example, the outer diameter 96 of the ring 68 is less than an inner diameter 100 of the sidewall 76 (see FIG. 5). The dual-walled duct 38, of course, is not limited to any particular ring configurations. For example, in alternative embodiments the ring 68 may have a full hoop body (e.g., a split ring body) or a segmented body.

Referring to FIG. 3, the ring 68 is arranged within the channel 70 as indicated above. During turbine engine operation, the ring 68 may engage the flange 66 and the impingement sleeve 62. For example, a radial inner surface 102 of the ring 68 may contact an outer radial surface 104 of the impingement sleeve 62 where, for example, the impingement sleeve 62 has thermally expanded. A longitudinal side surface 106 of the ring 68 may contact the coated surface 84 of the upstream endwall 72 where, for example, the pressure of the cooling air within the cooling channel 48 is less than the pressure of the air in the plenum 54. In this manner, the flange 66 and the ring 68 may substantially seal the gap between the flow sleeve 60 and the impingement sleeve 62.

Vibrations within the respective can combustor 28 during turbine engine operation may cause the ring 68 to vibrate within and/or otherwise move relative to the flange 66. The ring 68 therefore may radially and/or circumferentially rub against the flange 66, which may wear the surface 84 of the upstream endwall 72 (see FIG. 8). However, by bonding (e.g., brazing) the flange 66 to the flow sleeve 60 with the bonding material 80 (e.g., brazing material), the flange 66 may be relatively easily replaced with another flange 66 during engine maintenance as described below.

Figure 7:
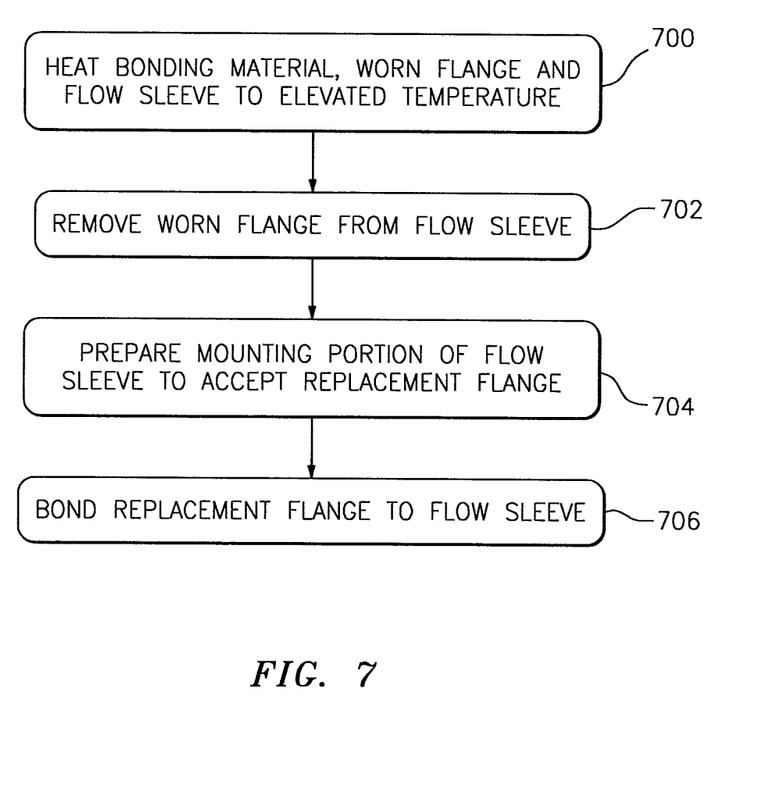
FIG. 7 is a flow diagram of a method for replacing a worn flange of the seal joint.
Figure 8:
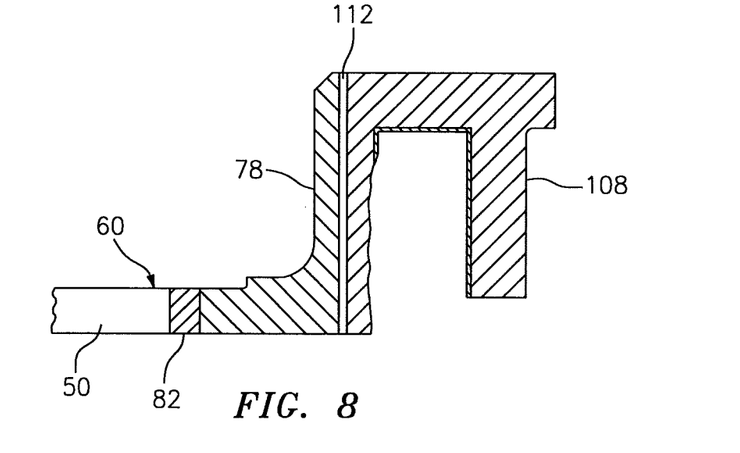
FIG. 8 is a partial sectional illustration of the flow sleeve with a worn flange.
Figure 9:
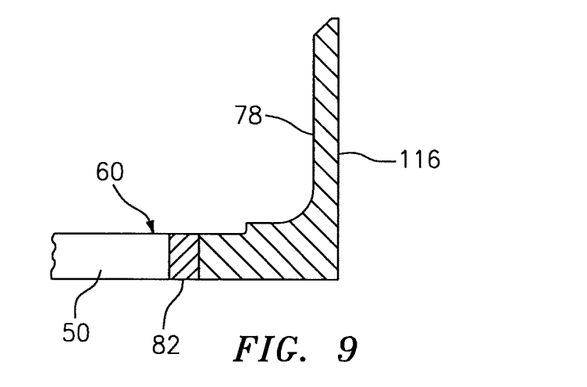
FIG. 9 is a partial sectional illustration of the flow sleeve after the flange has been removed.
Figure 10:
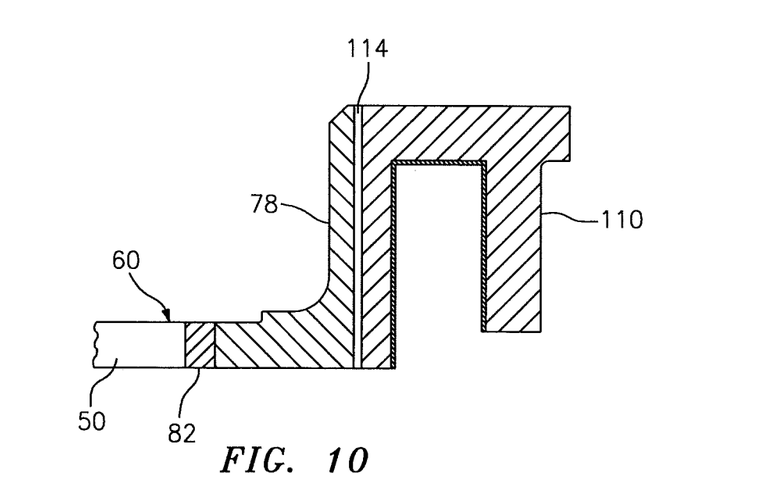
FIG. 10 is a partial sectional illustration of the flow sleeve with a replacement flange.

FIG. 7 is a flow diagram of a method for replacing a worn flange 108 with a replacement flange 110, both of which may have a similar configuration to that of the flange 66 as described above. FIG. 8 illustrates the worn flange 108, which is bonded to the mounting portion 78 with bonding material 112 similar to the bonding material 80 described above. FIG. 9 illustrates the mounting portion 78 of the flow sleeve 60. FIG. 10 illustrates the replacement flange 110, which is bonded to the mounting portion 78 with bonding material 114 similar to the bonding material 80 described above.

Referring to FIGS. 7 and 8, in step 700, the bonding material 112, the worn flange 108 and/or at least a portion of the flow sleeve 60 (e.g., the mounting portion 78) are heated to an elevated temperature; e.g., a brazing temperature less than or equal to about 1925 degrees Fahrenheit for AMS 4777 metal, or about 2075 degrees Fahrenheit for AMS 4778 metal. This elevated temperature is substantially equal to or greater than the melting point of the bonding material 112; e.g., the brazing material. The elevated temperature, however, is less than the melting point of the material of the flow sleeve; i.e., the casing material. The bonding material 112 therefore may melt and thereby break the bond between the worn flange 108 and the flow sleeve 60 without melting, thermally stressing and/or thermally deforming the flow sleeve 60. In contrast, breaking the bond between flow sleeve 60 and the worn flange 108 by a cutting or grinding operation may subject the flow sleeve 60 to relatively high temperatures. Such high temperatures may impart thermal stresses into and/or thermally warp the flow sleeve 60.

In step 702, the worn flange 108 is removed from the flow sleeve 60.

Referring to FIGS. 7 and 9, in step 704, the mounting portion 78 of the flow sleeve 60 is prepared to accept the replacement flange 110 (see FIG. 10). The elevated temperature, for example, may be maintained to facilitate removal of any remaining melted or partially melted bonding material 112 (see FIG. 8) from the mounting portion 78. The mounting portion 78 may also or alternatively be machined to provide a suitable surface 116 to which the replacement flange 110 may be bonded. The mounting portion 78, for example, may be honed to provide a relatively flat mating surface; i.e., the surface 116.

Referring to FIGS. 7 and 10, in step 706, the replacement flange 110 is bonded to the mounting portion 78 with the bonding material 114. The replacement flange 110, for example, may be brazed to the mounting portion 78 with brazing material (i.e., the bonding material 114) at an elevated temperature using various known brazing techniques.

The flange 66 and the ring 68 may have various configurations other than those described above and illustrated in the drawings. The channel 70, for example, may be defined by a single surface with a curved cross-sectional geometry. The ring 68 may have a non-rectangular cross-sectional geometry. The flange 66 may be bonded to the impingement sleeve 62, and the ring 68 may engage the flow sleeve 60. The present disclosure therefore is not limited to any particular flange, ring or joint configurations.

The terms "upstream", "downstream", "inner" and "outer" are used to orientate the components of the joint 64 described above relative to the dual-walled duct 38 and its centerline 40. A person of skill in the art will recognize, however, one or more of these components may be utilized in other orientations than those described above. The present disclosure therefore is not limited to any particular spatial orientations.

While various embodiments of the system 20 and the dual-walled duct 38 have been disclosed, it will be apparent to those of ordinary skill in the art that many more embodiments and implementations are possible within the scope of the disclosure. For example, the dual-walled duct 38 as described herein includes several aspects and embodiments that include particular features. Although these features may be described individually, it is within the scope of the present disclosure that some or all of these features may be combined with any one of the aspects and remain within the scope of the disclosure. Accordingly, the system 20 and the dual-walled duct 38 of the present disclosure are not to be restricted except in light of the attached claims and their equivalents.

What is claimed is:
1. A casing for a combustor, comprising:
   an upstream segment;
   a downstream segment constructed and arranged to move telescopically with respect to the upstream segment and along a centerline; and a joint having a first flange and bonding material attaching the first flange to a component, the component comprising the upstream segment;

the component comprising a tubular component body and an annular mounting flange that projects radially outward from the tubular component body;

the first flange comprising an annular first endwall, an annular second endwall and a tubular sidewall that extends longitudinally between the annular first endwall and the annular second endwall; and the annular first endwall and the annular second endwall each projecting radially inward from the tubular sidewall;

wherein the annular first endwall is attached to the annular mounting flange by the bonding material; and wherein a melting point of the bonding material is less than a melting point of the first flange, a melting point of the upstream segment and a melting point of the downstream segment.

2. The casing of claim 1, wherein the joint has a ring;

the first flange defines a channel opened radially for receipt of the ring; and the ring is constructed and arranged to seal against another one of the upstream segment and the downstream segment.

3. The casing of claim 2, wherein the first flange is attached to the upstream segment and the ring is in sliding contact with the downstream segment.

4. The casing of claim 3, wherein the upstream segment is radially outward of the downstream segment at the joint.

5. The casing of claim 1, wherein the ring comprises a piston ring.

6. The casing of claim 1, wherein the upstream segment is a flow sleeve and the downstream segment is an impingement sleeve.

7. The casing of claim 1, wherein the first flange is brazed to the upstream segment with the bonding material.

8. A combustor for an industrial gas turbine engine, comprising:

a nozzle assembly; and a casing connected downstream of the nozzle assembly;

the casing including a plurality of segments and a joint that at least partially seals a gap between the plurality of segments; and the joint including a flange that is brazed to a mounting portion of a first of the plurality of segments;

the first flange comprising a first endwall, a second endwall and a sidewall that extends longitudinally between the first endwall and the second endwall, wherein the first endwall and the second endwall each project radially inward from the sidewall; and the mounting portion configured as a mounting flange that projects radially outward from a tubular body of the first of the plurality of segments.

9. The combustor of claim 8, wherein the first flange is brazed to the mounting flange with brazing material; and the brazing material has a melting point that is less than a melting point of the mounting portion.

10. The combustor of claim 8, wherein the first flange defines a channel; and the joint further includes a ring that extends radially into the channel and engages a second of the plurality of segments.

11. The combustor of claim 10, wherein the ring comprises a piston ring.

12. The combustor of claim 8, wherein the first of the plurality of segments comprises a flow sleeve.

13. The combustor of claim 8, further comprising a liner arranged radially within the casing.

14. A method, comprising:

receiving a casing for an industrial gas turbine engine, the casing including a pair of segments and a joint for sealing a gap between the pair of segments, the joint including a first flange that is bonded to a second flange of a first of the pair of segments with bonding material, the first flange comprising a first endwall, a second endwall and a sidewall that extends longitudinally between the first endwall and the second endwall, the first endwall and the second endwall each projecting radially inward from the sidewall, and the second flange projecting radially outward from a tubular body of the first of the pair of segments;

melting the bonding material to break the bonding material between the first flange and the second flange;

removing the first flange from the first of the pair of segments; and bonding a replacement first flange to the second flange.

15. The method of claim 14, wherein the bonding of the replacement first flange comprises bonding the replacement first flange to the first of the pair of segments with bonding material having a melting point that is less than a melting point of the first of the pair of segments.

16. The method of claim 14, wherein the bonding of the replacement first flange comprises brazing the replacement first flange to the first of the pair of segments.

17. The casing of claim 1, wherein a longitudinal width of the annular mounting flange and a longitudinal width of the annular first endwall are each less than a longitudinal width of the annular second endwall.

\* \* \* \* \*